(No Model.) 3 Sheets—Sheet 1.
L. OETTINGER & M. SCHREIBER.
GLASS BRICK AND MANUFACTURE THEREOF.
No. 523,152. Patented July 17, 1894.
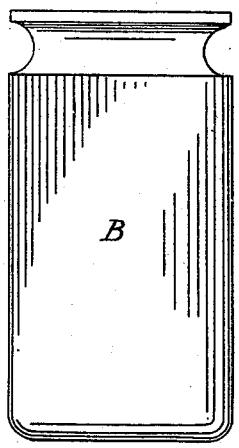
Fig. 1.
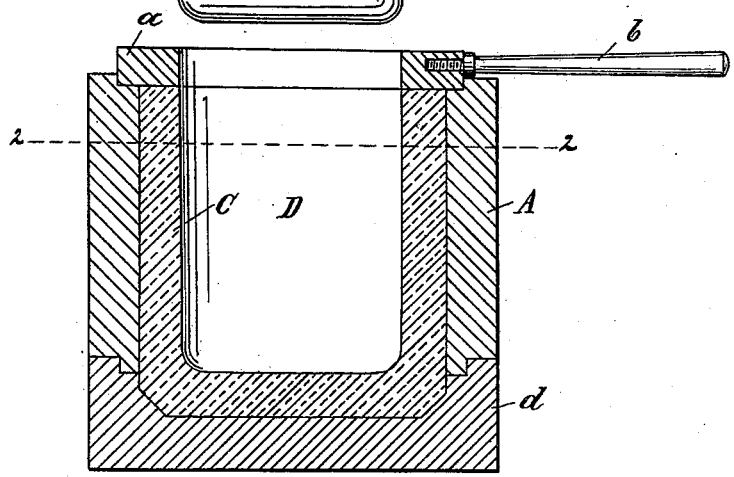
Fig. 2.
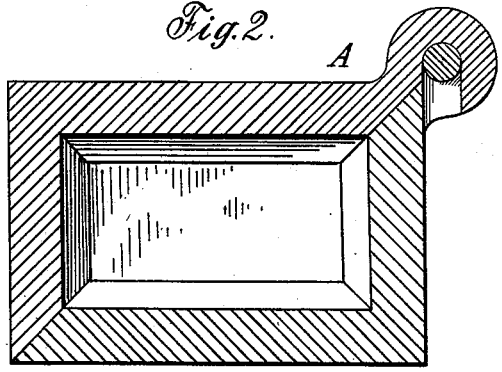
Witnesses:
J. C. Lebret.
T. Berwick.
Inventors:
Moritz Schreiber,
Louis Oettinger,
By H. H. deVas.
Attorney.

(No Model.) 3 Sheets—Sheet 2.
L. OETTINGER & M. SCHREIBER.
GLASS BRICK AND MANUFACTURE THEREOF.
No. 523,152. Patented July 17, 1894.
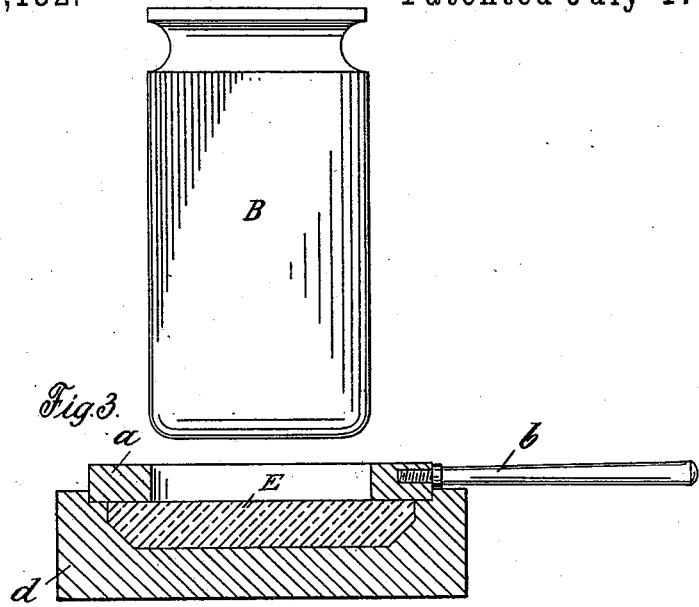
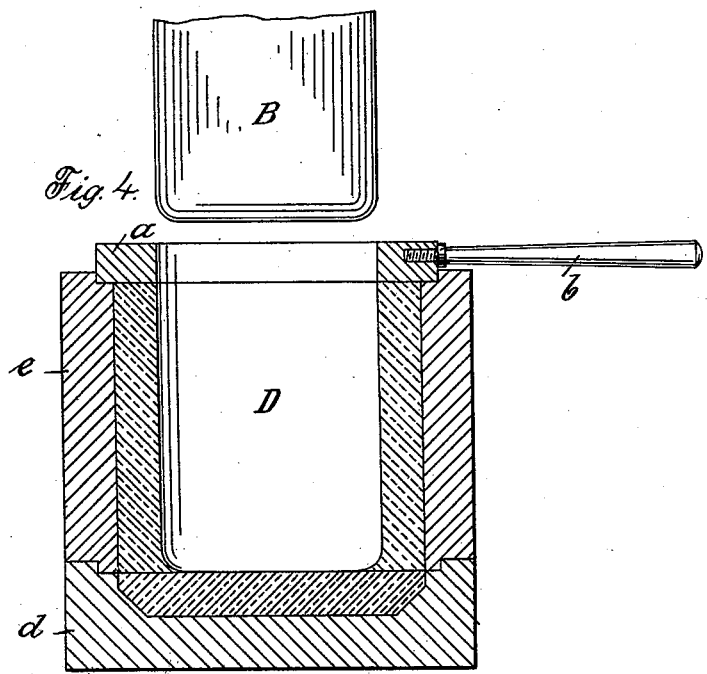
Witnesses:
Inventors:
Moritz Schreiber
Louis Oettinger
By H. A. deVos
Attorney.

(No Model.) 3 Sheets—Sheet 3.
L. OETTINGER & M. SCHREIBER.
GLASS BRICK AND MANUFACTURE THEREOF.
No. 523,152. Patented July 17, 1894.
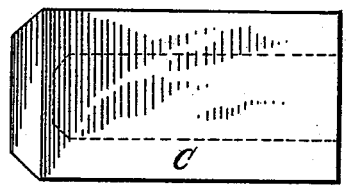
Fig. 7.
Fig. 6.
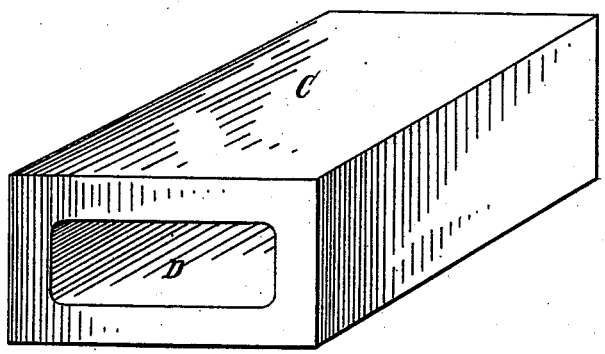
Fig. 5.
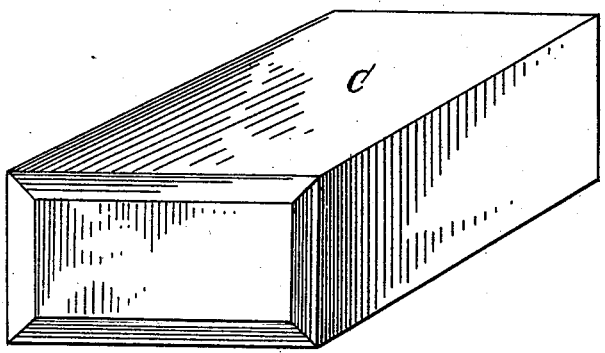
Witnesses
J. C. Lebret.
T. Zerwick.
Inventors
Moritz Schreiber,
Louis Oettinger,
By H. H. de Vos.
Attorney.
THE NORRIS PETERS CO., PHOTO-LITHO., WASHINGTON, D. C.

UNITED STATES PATENT OFFICE.

LOUIS OETTINGER, OF BERLIN, AND MORITZ SCHREIBER, OF BRIESEN, GERMANY.

GLASS BRICK AND MANUFACTURE THEREOF.

SPECIFICATION forming part of Letters Patent No. 523,152, dated July 17, 1894.

Application filed March 30, 1892. Serial No. 427,006. (No model.) Patented in England March 8, 1892, No. 4,525.

*To all whom it may concern:*

Be it known that we, LOUIS OETTINGER, residing at the city of Berlin, and MORITZ SCHREIBER, residing at the city of Briesen, in the Kingdom of Prussia, German Empire, both subjects of the King of Prussia, German Emperor, have invented certain new and useful Improvements in Glass Bricks and the Manufacture Thereof, (patented in Great Britain under No. 4,525, of March 8, 1892,) of which the following is a description.

Our invention relates to improvements in glass bricks and the manufacture thereof, and pertains especially to facing bricks. It is very important that such bricks have an opaque face, so that the wall behind the brick shall not show through. Heretofore this result has been obtained by glazing or enameling the face of the brick. But, on account of the numerous cracks and fissures that are always to be found in such bricks they are not adapted to outside work, since water and air enter the cracks, and the freezing of the water in cold weather cracks and peels off the glaze and enamel. We overcome this difficulty by making the brick homogeneous throughout, and in fact as one integral mass, in which there are no cracks or fissures, and by rendering the outer portion of the brick opaque, so that the rear wall can not be seen. The opaque portion of the brick can be colored any desired tints, to produce a variety of ornamental effects.

Our method for making the brick, and which we believe to be new in the art, consists essentially in molding the face of the brick, which is rendered opaque by any suitable coloring matter, and then, while the same is still heated to the point of fusion, filling the mold with the molten glass for the body portion, and subjecting the whole to pressure, whereby the opaque facing is permanently welded to and becomes integrally one with the body mass of the brick.

Reference is to be had to the accompanying drawings, forming part of this specification, in which similar reference letters indicate corresponding parts in all the views.

Figure 1 is a central sectional elevation of the mold we prefer to employ when making glass bricks of one color, the core being shown in connection with the mold. Fig. 2 is a cross sectional view of the mold, the view being taken on line 2—2 of Fig. 1. Fig. 3 is a central sectional view of a portion of the mold we prefer to use in making brick in which the exposed face is of different color than the brick body. Fig. 4 is a similar view of the entire mold and Figs. 5, 6 and 7 are views of our improved brick.

For the manufacture of facing bricks the lower part *d* of the mold A (Fig. 1) is closed by a closing ring *a*, and then the glass serving for the front plate is cast in the lower part and pressed. This stage of the operation is clearly shown in Fig. 3. The closing ring *a* is then immediately removed and the upper part of the mold A serving for the shaping of the main body of the brick, is placed upon the lower part *d*, and likewise closed by the ring *a*. (Figs. 1 and 4.) The mass for the body of the brick is then introduced, whereupon the whole is again subjected to the pressure of the die B, which serves at the same time for the formation of the cavity D. This pressing of the main body C upon the front plate E must of course be effected, while the previously pressed front plate is still hot and care is to be taken that the temperature of the masses of glass to be connected be the same. After pressing, the bricks are brought into a cooling kiln and are cooled off very slowly in order to prevent the bricks from becoming brittle and flawy.

The new glass bricks are not affected by the most marked changes in the temperature and are consequently entirely weatherproof.

In the manufacture of the bricks there is no limit as to the shape of the article or the manner of decorating same, because differently colored masses of glass are connected by pressure and highly artistic effects may be obtained by impressing ornamentations, by grinding, gilding, painting, which will be lasting when made so by a baking process. The front plate may advantageously be made of a finer quality of glass while the body is made of a rough differently colored or uncolored mass of glass.

Now, having described our improvement, we claim as our invention—

1. As a new article of manufacture, a composite facing brick composed of a body layer of a translucent glass and a facing layer of opaque glass and the two layers welded into one integral mass, substantially as described.

2. The method of manufacturing glass facing brick hereinbefore described, to wit: pouring the molten material which is to form the facing portion of the brick into a mold and pressing the molten material in the mold, then, while still at or near the melting point, filling the mold with the body portion in a melted state, pressing the whole whereby a welding is effected at the meeting surface, and cooling, substantially as described.

In witness whereof we have hereunto set our hands in presence of two witnesses.

LOUIS OETTINGER.
MORITZ SCHREIBER.

Witnesses:
FRIEDR. EHRHARDT,
CHR. FRISCH.